(12) United States Patent  
Soto

(10) Patent No.: US 10,595,651 B2  
(45) Date of Patent: Mar. 24, 2020

(54) METHODS AND SYSTEMS FOR A MOUNTING TOOL

(71) Applicant: Armando Soto, Laredo, TX (US)

(72) Inventor: Armando Soto, Laredo, TX (US)

(73) Assignee: DE SOTO BRANDS, Laredo, TX (US)

( * ) Notice: Subject to any disclaimer, the term of this patent is extended or adjusted under 35 U.S.C. 154(b) by 232 days.

(21) Appl. No.: 15/674,851

(22) Filed: Aug. 11, 2017

(65) Prior Publication Data

US 2018/0035829 A1 Feb. 8, 2018

Related U.S. Application Data

(60) Provisional application No. 62/374,028, filed on Aug. 12, 2016.

(51) Int. Cl.
| | |
|---|---|
| *A47G 1/17* | (2006.01) |
| *F16M 13/02* | (2006.01) |
| *F16B 47/00* | (2006.01) |
| *A47G 1/21* | (2006.01) |
| *A47G 1/10* | (2006.01) |
| *B44C 5/02* | (2006.01) |
| *A47G 1/06* | (2006.01) |

(52) U.S. Cl.
CPC .............. *A47G 1/17* (2013.01); *A47G 1/10* (2013.01); *A47G 1/21* (2013.01); *F16B 47/003* (2013.01); *F16M 13/022* (2013.01); *A47G 1/0638* (2013.01); *A47G 1/215* (2013.01); *B44C 5/02* (2013.01)

(58) Field of Classification Search
CPC .......... A47G 1/10; A47G 1/21; A47G 1/0638; A47G 1/215; A47G 1/17; B44C 5/02
See application file for complete search history.

(56) References Cited

U.S. PATENT DOCUMENTS

| | | | | | |
|---|---|---|---|---|---|
| 1,982,143 | A | * | 11/1934 | Schill | A47G 1/10 248/490 |
| 2,523,815 | A | * | 9/1950 | Cloyd | A47G 1/10 40/790 |
| 2,728,451 | A | * | 12/1955 | Leander | B65D 81/055 206/453 |
| 2,843,901 | A | * | 7/1958 | Bukowski | B42F 1/12 24/67 CF |
| 3,849,920 | A | * | 11/1974 | Trowbridge | A47G 1/10 40/784 |
| 4,179,089 | A | * | 12/1979 | Parr, Jr. | A47G 1/215 248/201 |
| D311,029 | S | * | 10/1990 | Nielsen | D20/10 |
| 5,199,681 | A | * | 4/1993 | Reidy | A47G 1/0638 248/216.1 |
| 5,212,850 | A | * | 5/1993 | Rerolle | B42F 1/12 24/543 |
| 5,255,458 | A | * | 10/1993 | Piel | A47G 1/0638 24/487 |

(Continued)

FOREIGN PATENT DOCUMENTS

| | | | |
|---|---|---|---|
| DE | 19514648 A1 * | 10/1996 | ............. A47G 1/21 |
| WO | WO2009129207 | 10/2009 | |
| WO | WO-2009129207 A1 * | 10/2009 | ............. B44C 5/02 |

*Primary Examiner* — Eret C McNichols

(74) *Attorney, Agent, or Firm* — Pierson IP, PLLC

(57) ABSTRACT

Embodiments disclosed herein describe fracturing methods and systems to temporarily mount an object to a flat surface without damaging the object or the flat surface.

16 Claims, 10 Drawing Sheets

(56) References Cited

U.S. PATENT DOCUMENTS

| | | | | |
|---|---|---|---|---|
| 5,390,889 A * | 2/1995 | Hiscock | .................... | A47G 1/17 |
| | | | | 24/67 CF |
| 5,799,429 A * | 9/1998 | Speshyock | ........... | A47G 1/0638 |
| | | | | 248/488 |
| 5,947,437 A * | 9/1999 | Tate | ......................... | A47G 1/17 |
| | | | | 248/216.1 |
| 8,925,228 B2 * | 1/2015 | Edmondson | ......... | A47G 1/0633 |
| | | | | 40/773 |
| 10,093,455 B2 * | 10/2018 | Lee | .................... | B65D 33/1675 |
| 10,117,531 B1 * | 11/2018 | Hoban | ................. | A47G 1/0638 |

\* cited by examiner

METHODS AND SYSTEMS FOR A MOUNTING TOOL

CROSS-REFERENCE TO RELATED APPLICATIONS

This application claims a benefit of priority under 35 U.S.C. § 119 to Provisional Application No. 62/374,028 filed on Aug. 12, 2017, which is fully incorporated herein by reference in their entirety.

BACKGROUND INFORMATION

Field of the Disclosure

Examples of the present disclosure relate to systems and methods for a mounting tool configured to secure an object on a flat surface without damaging the object and providing minimal damage to the flat surface.

Background

Conventionally, more expensive systems like framing and less expensive systems such as adhesives, mounting putties, tapes, and thumb tacks are used to hang objects such as photos, posters, prints, etc. on flat surfaces such as fridges, mirrors, walls, etc. However, these conventional systems either damage the object itself, the flat surface, or both.

For example, to hang an object on a wall within a frame, it is first required to place a nail through the wall, and then mount the frame on the nail. This procedure causes unwanted punctures in a wall. Alternatively, when using an adherable backing—such as adhesives, mounting putties, or tapes—to hang an object on a wall, the adherable backing is directly applied to a surface of the object and to the wall. However, when removing the adherable backing from the object, the adherent may remove both portions of the object and portions of the wall like paint. When using thumb tacks to mount the object to the wall, a nail associated with the thumbtack is positioned through both the object and the wall. This causes punctures through both the object and the wall, damaging both the object and the wall.

Accordingly, needs exist for systems and methods that allow for an object to be temporarily mounted on a flat surface without damaging the object and providing minimal damage to the flat surface.

SUMMARY

Embodiments disclosed herein describe methods and systems to temporarily mount an object to a flat surface without damaging the object and providing minimal damage to the flat surface.

Embodiments may include mounting tools that are configured to interface with the corners of an object, wherein the object may be any photo, poster, print, etc. The mounting tools may be substantially triangular in shape, wherein the mounting tools may form right triangles. Embodiments may include a base, rotating member, and compressible layer.

The base may be configured to be positioned flush against a mounting surface, and may include planer upper and lower surfaces. The base may be substantially triangular in shape, such as a right triangle. Rotating projections may be positioned on the ends of an edge opposite the hypotenuse of the right triangle, wherein the rotating projections are configured to couple the base with the rotating member. A locking projection may be positioned at or proximate to an intersection of the hypotenuse and adjacent edges. The locking projection may be configured to selectively receive a locking lip positioned on the rotating member. In embodiments, the base may also include a pin hole, which is configured to receive the nail of a tack.

The rotating member may be a device that is triangular in shape, and configured to rotate respective to the base. The rotating member may include receivers positioned on the ends of an edge opposite the hypotenuse of the right triangle, wherein the receivers are configured to receive and encompass the projections positioned on the base. Responsive to the projections being positioned within the receivers, the rotating member may rotate respective to the base. The rotating member may also include a locking lip positioned on or proximate to an intersection of the hypotenuse and adjacent edges. The locking lip may be configured to selectively interface with the locking projection on the base to releasably couple the base with the rotating member.

The compressible layer may be comprised of a material that can be compressed and decompressed, like rubber. The compressible layer may be configured to be inserted between the base and the rotating member. The compressible layer may include a circular orifice and an indentation. The circular orifice may be positioned proximate to an adjacent and opposite end of the triangle and align with the pin hole in the base, wherein the circular orifice is configured to receive the body of the tack. Responsive to positioning the body of the tack within the circular orifice, the nail of the tack may be inserted through the pin hole. The indentation may be a cutout, groove, etc. positioned on the hypotenuse of the compressible layer, proximate to an intersection of the hypotenuse and the adjacent edge. Utilizing the indentation, a user may positioned their finger between the base and the rotating member to disengage the locking lip with the locking projection, such that the rotating member may rotate away from the base.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
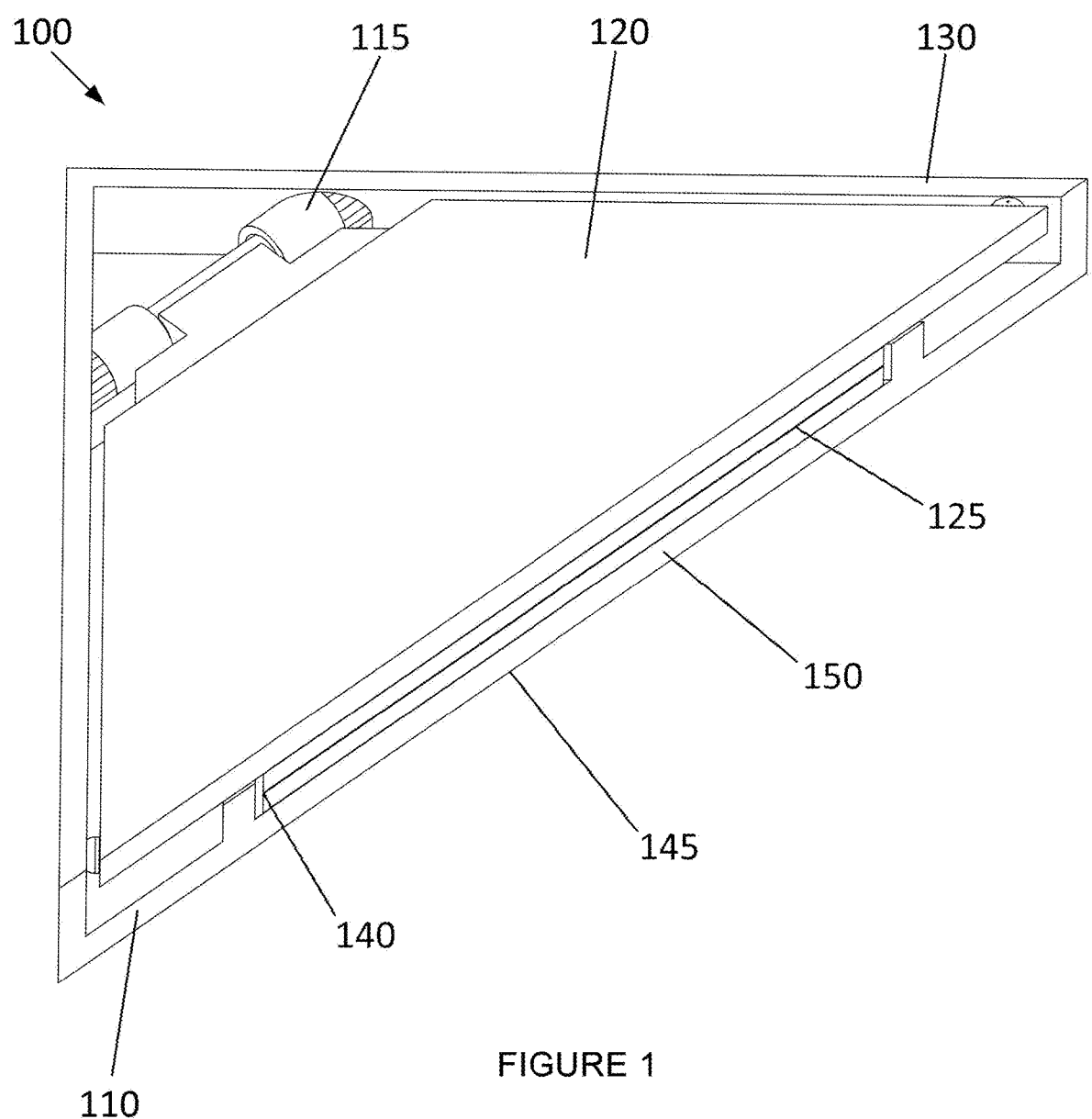
FIG. 1 depicts a mounting tool, according to an embodiment.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present embodiments. It will be apparent, however, to one having ordinary skill in the art, that the specific detail need not be employed to practice the present embodiments. In other instances, well-known materials or methods have not been described in detail in order to avoid obscuring the present embodiments.

FIG. 1 depicts a mounting tool 100, according to an embodiment. Mounting tool 100 may be configured to be affixed to a flat surface to temporarily support an object 150 in place. In embodiments, a plurality of mounting tools 100 may be used to support the object 150 on the flat surface, wherein a mounting tool 100 may be positioned on each corner of the object.

Mounting tool 100 may include a front surface 110, hinge 115, a hinged rear face 120, external sidewalls 130, and an internal chamber 140.

Rear face 120 may be a lower surface of mounting tool 100, wherein rear face 120 may be configured to be positioned on a flat surface, such as a fridge, mirror, wall, etc. Rear face 120 may be planar and have an adherable backing, such as an adhesive or magnet, so the rear face may be affixed onto the flat surface.

Hinge 115 may be positioned proximate to an intersection of the external sidewalls 130. Hinge 115 may be a mechanical bearing that is configured to be coupled with an inner surface of front surface 110 and hinged rear face 120. Hinge 115 may be configured to enable hinged rear face 120 to rotate about a fixed axis or rotation.

Hinged rear face 120 may be coupled with hinge 115, such that hinged rear face 120 may rotate between a first position (as shown in FIG. 1) to a second position. In the first position, hinged rear face 120 may cover internal chamber 140 to secure the object 150 within mount 100. In the second position, hinged rear face 120 may be positioned away from internal chamber 140 to allow object 150 to be removed from or inserted into internal chamber 140. An inner surface of hinged rear face 120 may also include a first compressible layer 125. First compressible layer 125 may be comprised of a material that can be compressed and decompressed, like rubber.

External sidewalls 130 may define outer boundaries and height of mounting tool 100. Responsive the hinged rear face 120 being in the first position, sidewalls of hinged rear face 120 may be positioned adjacent to external sidewalls 130. Furthermore, responsive to hinged rear face 120 being in the first position, a top surface of hinged rear face 120 may be planar with the top surfaces of external sidewalls 130.

Internal chamber 140 may be positioned between the external sidewalls 130 of mounting device 100. Internal chamber 140 may include internal sidewalls and a compressible layer 140.

The internal sidewalls may be comprised of two sidewalls that project away from an inner surface of the front surface 110 towards an inner surface of the hinged rear face 120 when the hinged rear face 120 is in the first position. The height of the internal sidewalls may be less than a height of the external sidewalls 130. In embodiments, the internal sidewalls may be positioned away from external sidewalls 130 to form channels between the internal sidewalls and the external sidewalls 130. This may cause the width of hinged rear face 120 to be less than that of external sidewalls 130 but greater than that of the internal sidewalls.

The second compressible layer 145 may be comprised of a material that can be compressed and decompressed, like rubber. Second compressible layer 145 may be positioned on top of the inner surface of the front surface 110 and between the internal sidewalls. In embodiments, when a corner of an object 150 is positioned between the internal sidewalls and the hinged rear face 120 is in the first position, the object 150 may be secured within the mounting tool 100 via a compressive force caused by first compressible layer 125 and second compressible layer 145 against object 150. The height of the second compressible layer 145 may be less than a height of the internal sidewalls. However, second compressible layer 145 may have a height that can dynamically change based on the compressive force, this may enable mounting tool 100 to not damage the object 150. In embodiments, the dimensions of first compressible layer 125 and second compressible layer 145 may be substantially the same.

Figure 2:
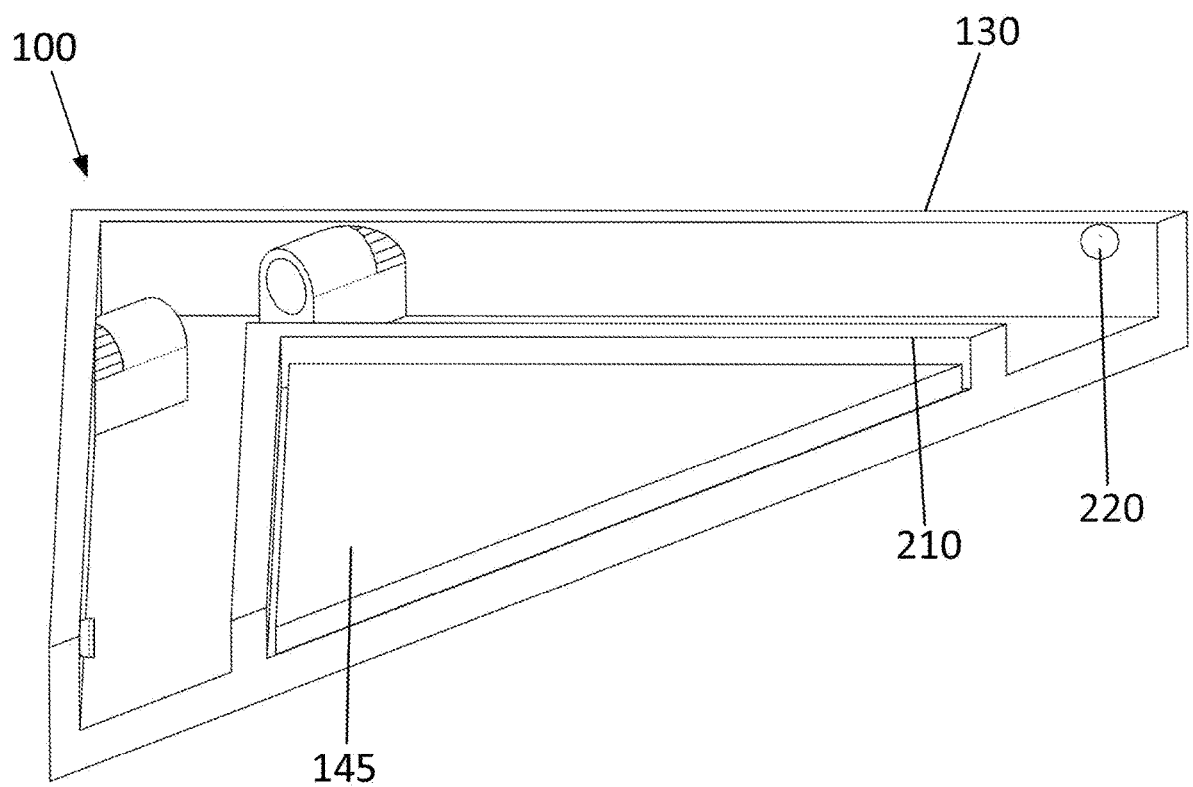
FIG. 2 depicts mounting tool without hinged rear face, according to an embodiment.

FIG. 2 depicts mounting tool 100 without hinged rear face 120, according to an embodiment.

As depicted in FIG. 2, internal sidewalls 210 may be spaced away from external sidewalls 130, wherein second compressible layer 145 may be positioned within the perimeter of internal sidewalls 210.

As further depicted in FIG. 2, first coupling mechanisms 220 may be positioned on proximal ends of external sidewalls 130. First coupling mechanisms 220 may be configured to temporally interface with second coupling members position on hinged rear face 120. First coupling mechanisms 220 may be projections that are configured to be inserted into corresponding depressions forming the second coupling members, or vice versa. One skilled in the art may appreciate that the coupling members may be any form of device configured to temporally couple to objects together, such as buttons, snaps, Velcro, etc.

Responsive to placing the hinged rear face 120 in the first position, first coupling mechanisms 220 may engage with the second coupling members to secure hinged rear face 120 in the first position. Responsive to applying downward force to hinged rear face 120, first coupling mechanisms 220 may disengage with the second coupling mechanisms. This may allow hinged rear face 120 to be placed in the second position.

Figure 3:
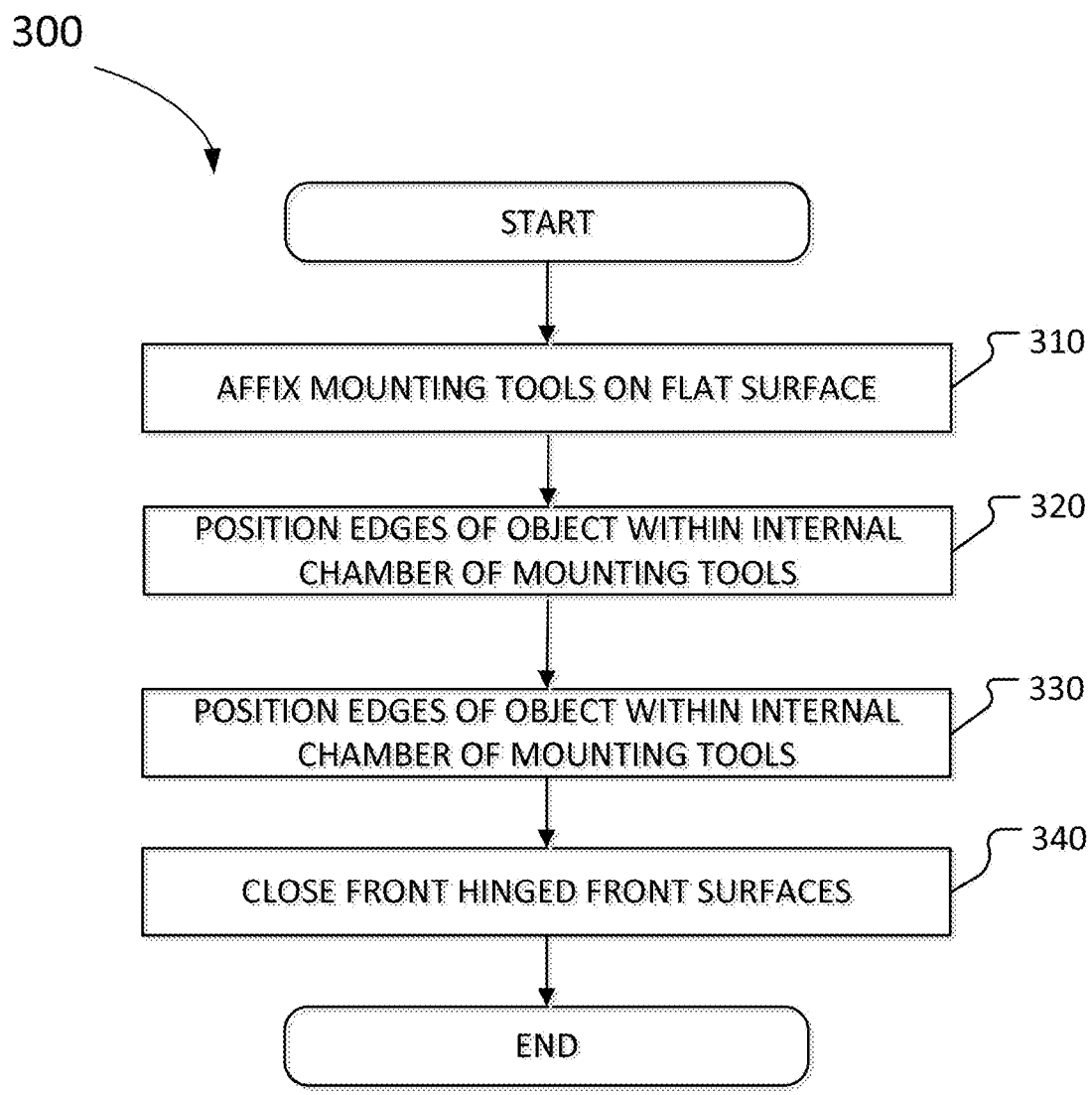
FIG. 3 depicts a method for utilizing a mounting tool to temporarily frame an object, according to an embodiment.

FIG. 3 depicts a method 300 for utilizing a mounting tool to temporally frame an object, according to an embodiment. The operations of method 300 presented below are intended to be illustrative. In some embodiments, method 300 may be accomplished with one or more additional operations not described, and/or without one or more of the operations discussed. Additionally, the order in which the operations of method 300 are illustrated in FIG. 3 and described below is not intended to be limiting. For example, operation 310 may be performed after coupling the mounting tools to the object.

At operation 310, mounting tools may be affixed on a flat surface. The mounting tools may be affixed to the flat surfaces such that corners of an object align with the mounting tools.

At operation 320, the hinged surfaces of each of the mounting tools may be opened. The hinged surfaces may be opened by applying force to decouple first coupling mechanisms positioned on external sidewalls of the mounting tool from second coupling mechanisms positioned within the hinged front surfaces.

At operation 330, corners of the object may be positioned within internal sidewalls of the mounting tools. The corners may be positioned over a compressible layers placed within a boundary defined by the internal sidewalls.

At operation 340, the hinged surfaces may be closed by interfacing the first coupling mechanisms and the second coupling mechanisms. Responsive to closing the hinged surfaces, a compressive force between the compressible layers may secure the corners of the object in place within damaging the object.

Figure 4:
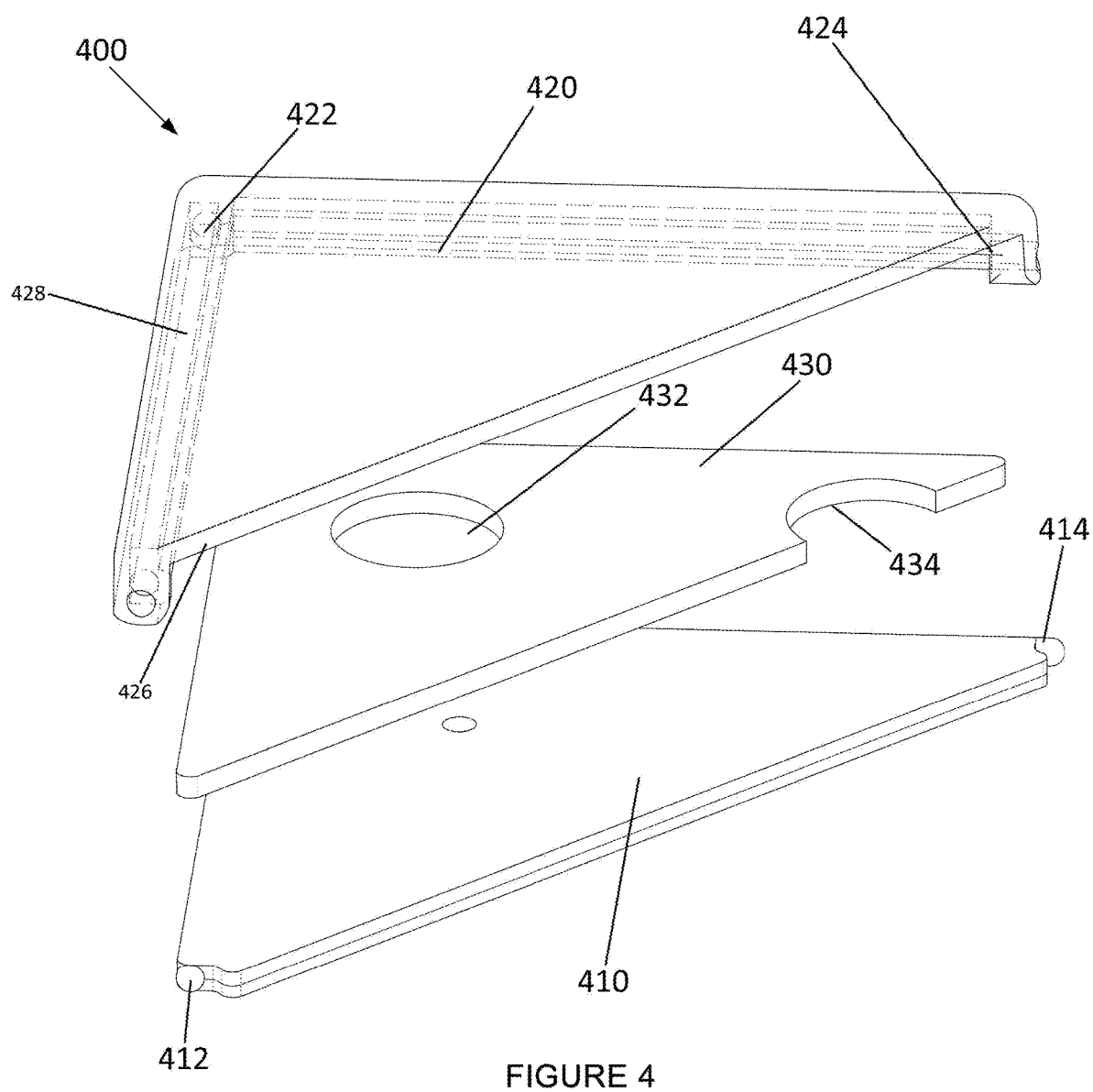
FIG. 4 depicts a mounting tool, according to an embodiment.

FIG. 4 depicts a mounting tool 400, according to an embodiment. Mounting tool 400 may be configured to be affixed to a flat surface to temporarily support an object in place. In embodiments, a plurality of mounting tools 400 may be used to support the object on the flat surface, wherein a mounting tool 400 may be positioned on each corner of the object. Mounting tool 400 may be substantially triangular in shape, along with each of the elements of mounting tool 400. Mounting tool 400 may include a base 410, rotating member 420, and compressible layer 430.

Base 410 may be configured to be positioned flush against a mounting surface, such as a wall. Base 410 may include planer upper and lower surfaces that extend uniformly across the body of base 410. Base 410 may be substantially triangular in shape, such as a right triangle. Base 410 may include rotating projections 412 and locking projection 414.

Rotating projections 412 may be positioned on the ends of an edge opposite the hypotenuse of the right triangle. Rotating projections 412 may be abuts, extensions, etc. that extend away from a body of base 410 in a plane that is between the upper and lower surfaces of base 410. As such, rotating projections 412 do not extend above or below the upper and lower surfaces of base 410. Rotating projections 412 are configured to receiving receivers positioned on rotating member 420 to define an axis of rotation for rotating member 420, wherein the axis of rotating may be located between the upper and lower surfaces of base 410.

Locking projection 414 may be a device that is configured to selectively interface with rotating member 420 to lock and unlock rotating member 420 in place. Locking projection 414 may be an abut, extension, etc. positioned on an intersection of an adjacent and hypotenuse of base 410. Accordingly, each of the corners of base 410 may include a projection. Locking projection 414 may be positioned on an end of the adjacent edge to allow for maximum rotation and locking force created between locking projection 414 and rotating member 420.

Rotating member 420 may be a device that is substantially triangular and shape, and configured to rotate respective to base 410 along the axis defined by rotating projections 412. Rotating member 420 may include receivers 422 and locking lip 424.

Receivers 422 may be positioned on the ends of an edge opposite the hypotenuse of the triangle, and be cuts, grooves, indentations, etc. that are reciprocal in shape to rotating projections 412. Responsive to inserting rotating projections 412 into receivers 422, rotating member 420 may be configured to rotate along the fixed axis. Furthermore, responsive to inserting rotating projections 412 into receivers, the opposite edge of the rotating member 420 may encompass the corresponding edge of base 410. This may be due to the opposite edge of rotating member 420 having a taller height and a wider width.

Locking lip 424 may be formed of a curved corner of rotating member 420 with a cut, groove, indentation, etc. wherein the curved corner is configured to wrap around an intersection of the adjacent edge along the hypotenuse of rotating member 420. Locking lip 424 may be configured to be press fit with locking projection 414 to selectively secure rotating member 420 with base 410. Responsive to applying downward force on rotating member 420, locking projection 414 may slide through an open, lower surface of locking lip 424 to be secured within a cavity of locking lip 424. Responsive to applying upward force to rotating member 420, locking lip 424 may disengage with locking projection 414, which may allow for the rotating of rotating member 420.

In embodiments, rotating member 420 may also include a hypotenuse sidewall 426, wherein a height of sidewall 426 is shorter than a height of the edge 428 opposite the sidewall 426. This may cause rotating member 420 to have a lower exposed chamber within a cavity of rotating member 420.

Compressible layer 430 may be comprised of a material that can be compressed and decompressed, like rubber. Compressible layer 430 may be configured to be inserted between base 410 and rotatable member. Compressible layer 420 may have a shape and/or size similar to that of the upper surface of base 410. Compressible layer 430 may be configured to interface with an object positioned over compressible layer 430, such that when rotatable member 420 is in the closed position, compressible layer 430 compresses to create a force against the inner surface of rotatable member 430 to secure the object in place. Compressible layer 430 may include a circular orifice 432 and indentation 434.

Circular orifice 432 may be a circular cutout positioned through compressible layer 430. Circular orifice 432 may be positioned proximate to an intersection of the edges opposite and adjacent to the hypotenuse of compressible layer 430. The location of circular orifice 432 may allow a tack to be inserted through an object secured in place via mounting system 400. In embodiments, circular orifice 432 may be aligned with a pin hole (not shown in FIG. 1) extending through base 410. A body of a tack may be positioned with circular orifice 432 and the nail of the tack may be positioned through the pin hole.

Indentation 434 may be a cutout, groove, etc. positioned on the hypotenuse of compressible layer 430. Indentation 434 may be positioned proximate to an interface between locking projection 414 and locking lip 424. Indentation 434 may be configured to form a slot where a user may insert their finger to apply force to rotating member 420.

Figure 5:
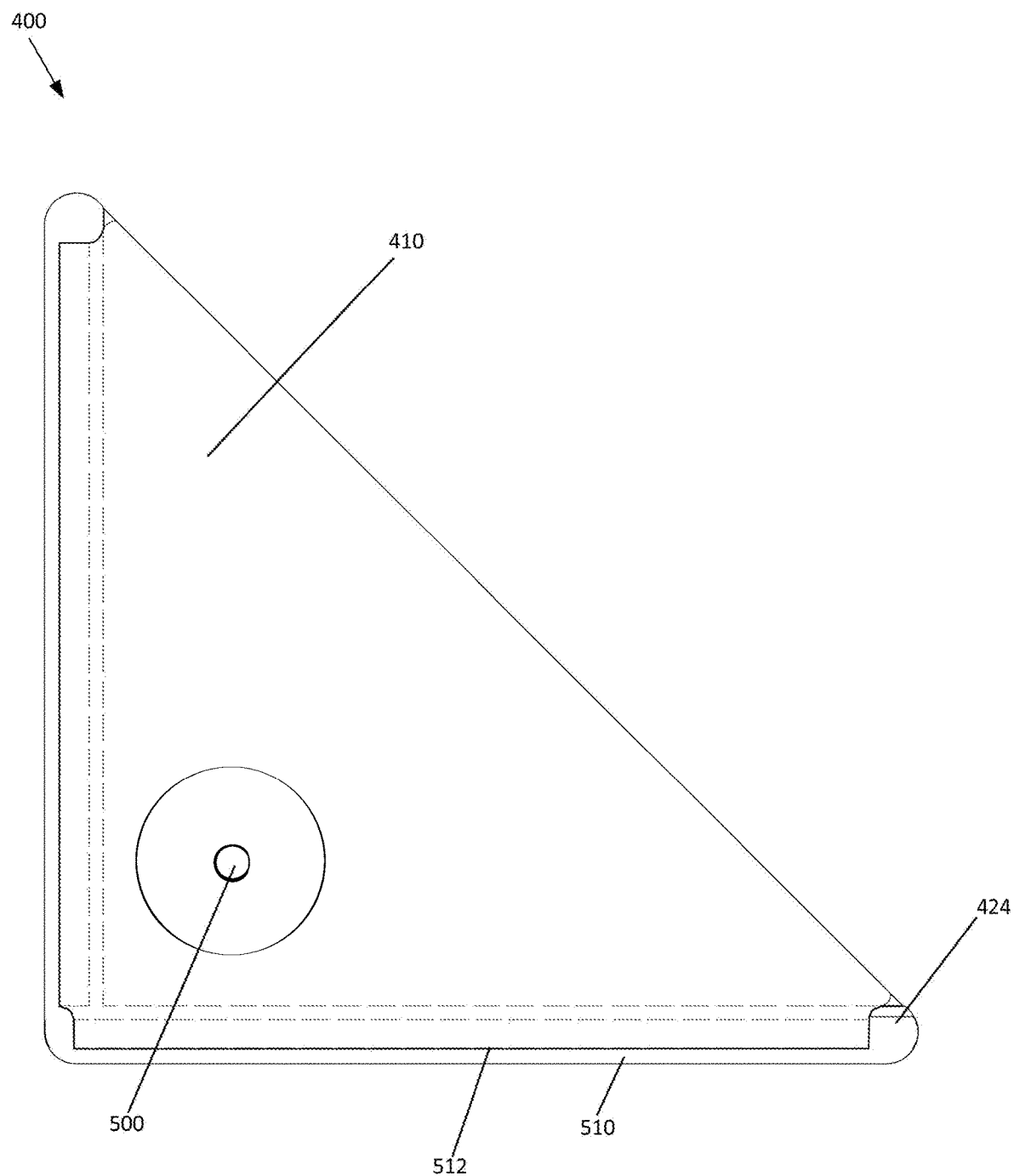
FIG. 5 depicts a bottom view of a mounting tool, according to an embodiment.
Figure 6:
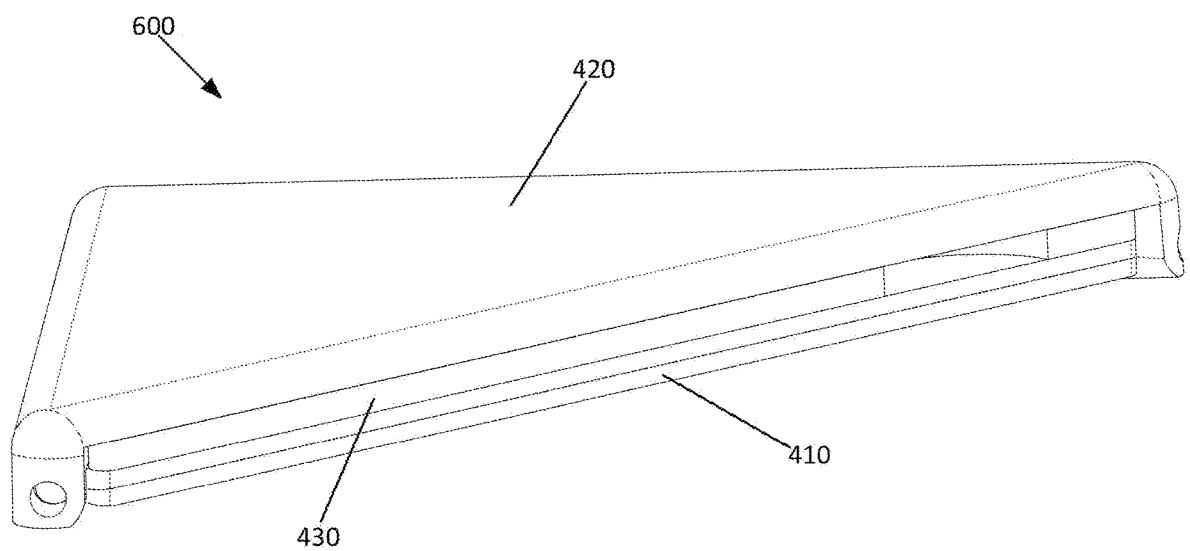
FIGS. 6-10 depicts various views view of a mounting tool, according to an embodiment.
Figure 7:
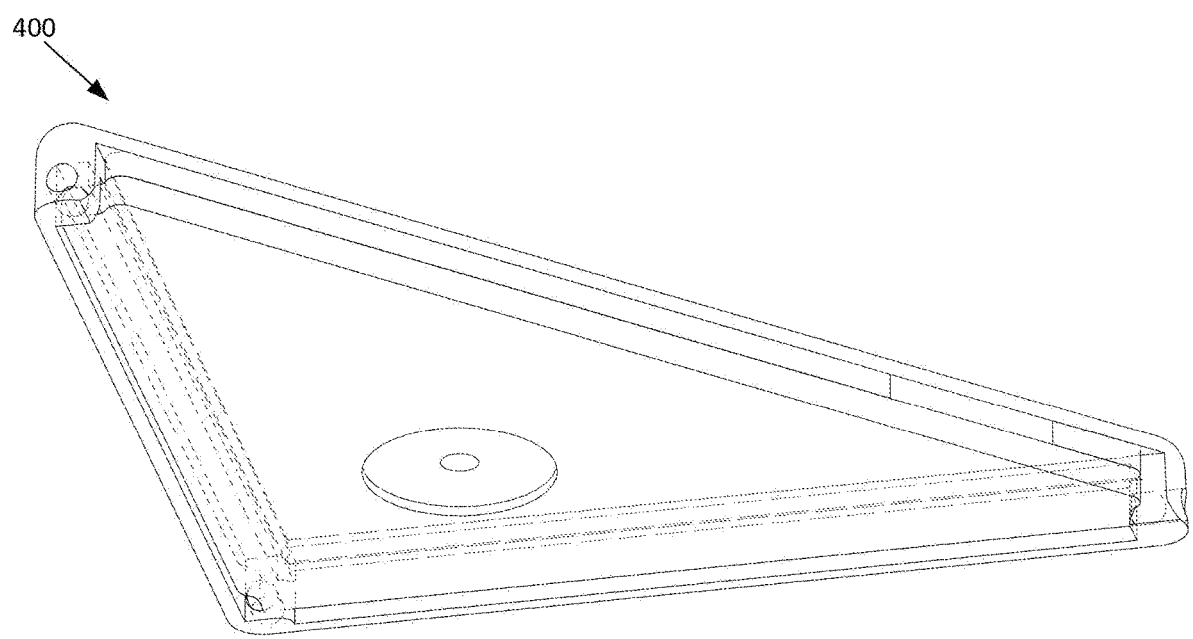
Figure 8:
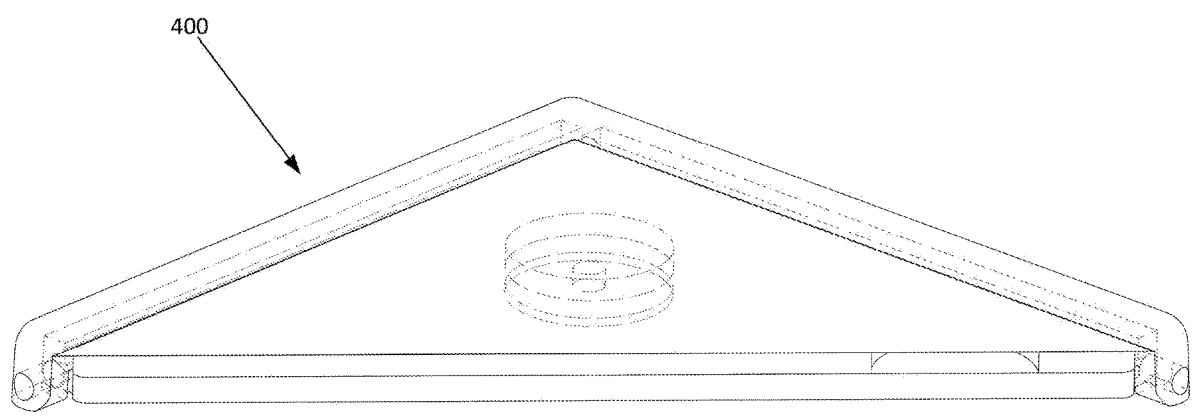
Figure 9:
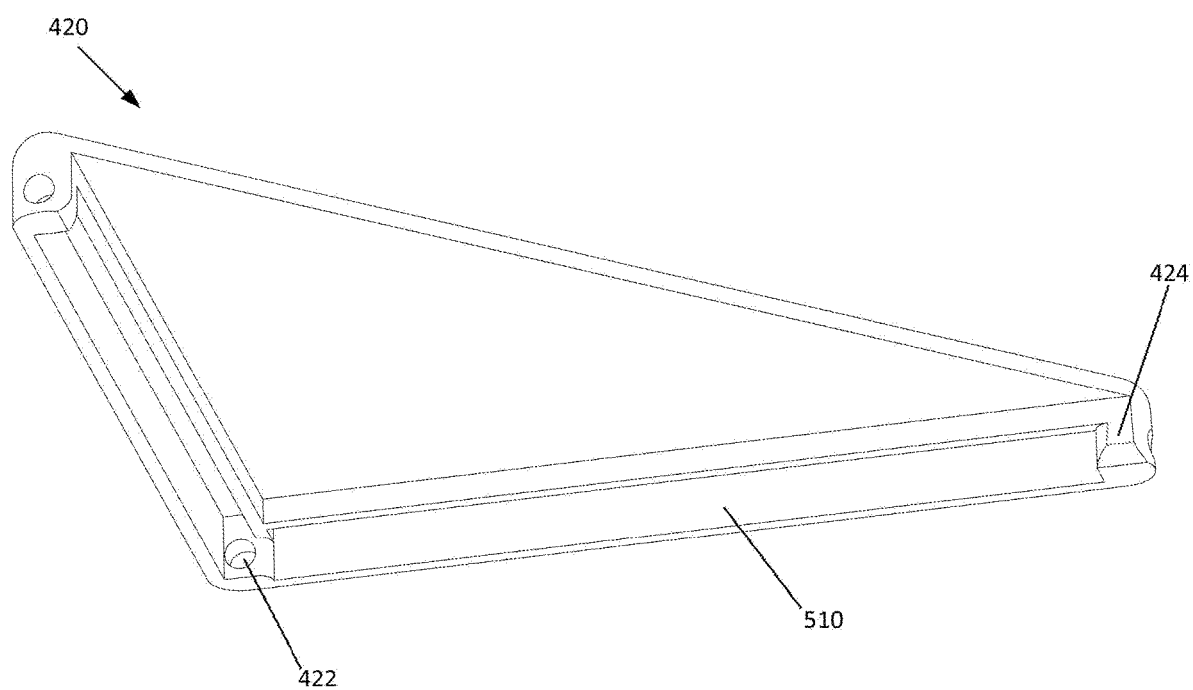
Figure 10:
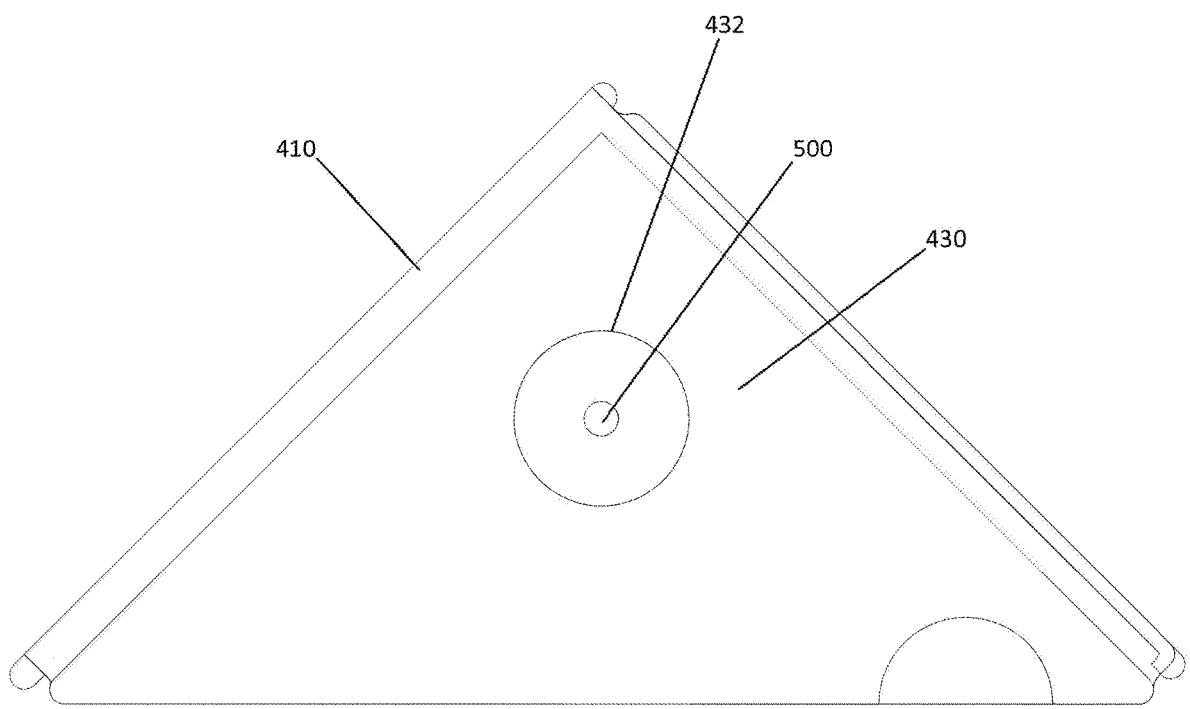

FIG. 5 depicts a bottom view of mounting tool 400, according to an embodiment. Elements depicted in FIG. 5 may be described above, and for the sake of brevity another description of these elements may be omitted.

As depicted in FIG. 5, base 410 may include a pinhole 500. Pinhole 500 may be configured to receive a nail of a tack positioned within circular orifice 432, wherein a diameter of pinhole 500 is smaller than that of circular orifice 432.

As further depicted in FIG. 5, rotating member 320 may have a sidewall 510 that extends along the adjacent edge of rotating member 420. Sidewall 510 may be configured to be positioned adjacent to and outside a corresponding sidewall 512 of base 410 when base 410 is interfaced with rotating member 420. Additionally, locking lip 424 is configured to wrap around a first end of sidewall 512 to allow locking projection 414 to be interfaced with locking lip 424.

FIGS. 6-10 depicts various views view of mounting tool 400, according to an embodiment. Elements depicted in FIG. 6-10 may be described above, and for the sake of brevity another description of these elements may be omitted.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale. For example, in embodiments, the length of the dart may be longer than the length of the tool.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A mounting system comprising:
    a base being triangular in shape with three edges and an adherable backing, the base including rotating projections positioned on the ends of a first edge of the base, and the base including a locking projection positioned on an end of a second edge of the base;
    a rotating member being triangular in shape, the rotating member having a longer hypotenuse than that of the base and a greater height than that of the base, the rotating member including receivers positioned on a first edge of the rotating member, wherein the rotating members are configured to receive the rotating projections, and the first edge of the rotating member encompasses the first edge of the base;
    a compressible layer formed of a compressible material, the compressible layer being configured to be positioned between the rotating member and the base when the rotating member is interfaced with the base, wherein a hypotenuse of the compressible layer includes an indentation, and a body of the compressible layer includes a circular orifice.

2. The mounting system of claim 1, wherein the rotating member includes a locking lip that is configured to interface with the locking projection to temporarily couple the rotating member with the base.

3. The mounting system of claim 2, wherein the locking lip is configured to wrap around the end of the second edge of the base.

4. The mounting system of claim 1, wherein the rotating member is configured to rotate about an axis defined by the rotating projections.

5. The mounting system of claim 4, wherein the axis is in a plane between an upper surface and a lower surface of the base.

6. The mounting system of claim 5, wherein the axis is positioned below an upper surface of the rotating member when the rotating member is interfaced with the base.

7. The mounting system of claim 1, wherein a first height of the hypotenuse edge of the rotatable member is less than a second height of the first edge of the rotating member.

8. A method of utilizing a mounting system comprising:
    coupling a rotating member with a base, the base being triangular in shape with three edges and an adherable backing, the base including rotating projections positioned on the ends of a first edge of the base, and the base including a locking projection positioned on an end of a second edge of the base, the rotating member being triangular in shape, the rotating member having a longer hypotenuse than that of the base and a greater height than that of the base, the rotating member including receivers positioned on a first edge of the rotating member, wherein the rotating members are configured to receive the rotating projections, and the first edge of the rotating member encompasses the first edge of the base; and rotating the rotating member relative to the base;
    positioning a compressible layer formed of a compressible material between the rotating member and the base when the rotating member is interfaced with the base, wherein a hypotenuse of the compressible layer includes an indentation and a body of the compressible layer includes a circular orifice.

9. The mounting system of claim 8, wherein the base includes a pinhole that is configured to align with the circular orifice, a first diameter of the pinhole being smaller than a second diameter of the circular orifice.

10. The method of claim 8, further comprising: interfacing a locking lip on the rotating member with the locking projection to temporarily couple the rotating member with the base.

11. The method of claim 10, wherein the locking lip is configured to wrap around the end of the second edge of the base.

12. The method of claim 8, further comprising: rotating the rotating member about an axis defined by the rotating projections.

13. The method of claim 12, wherein the axis is in a plane between an upper surface and a lower surface of the base.

14. The method of claim 13, wherein the axis is positioned below an upper surface of the rotating member when the rotating member is interfaced with the base.

15. The method of claim 8, wherein a first height of the hypotenuse edge of the rotatable member is less than a second height of the first edge of the rotating member.

16. The method of claim 8, wherein the base includes a pinhole that is configured to align with the circular orifice, a first diameter of the pinhole being smaller than a second diameter of the circular orifice.

* * * * *